United States Patent
Sehsah (10) Patent No.: US 10,502,009 B2
(45) Date of Patent: Dec. 10, 2019

(54) SMART SELECTIVE DRILLING FLUID SYSTEM

(71) Applicant: Saudi Arabian Oil Company, Dhahran (SA)

(72) Inventor: Ossama R. Sehsah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 64 days.

(21) Appl. No.: 15/434,575

(22) Filed: Feb. 16, 2017

(65) Prior Publication Data

US 2018/0230761 A1 Aug. 16, 2018

(51) Int. Cl.
| | | |
|---|---|---|
| *E21B 21/01* | (2006.01) | |
| *G05D 7/06* | (2006.01) | |
| *E21B 44/00* | (2006.01) | |
| *E21B 21/00* | (2006.01) | |

(52) U.S. Cl.
CPC ............. *E21B 21/01* (2013.01); *E21B 44/00* (2013.01); *G05D 7/0641* (2013.01); *E21B 2021/007* (2013.01)

(58) Field of Classification Search
CPC ................................. E21B 21/01; E21B 44/00
See application file for complete search history.

(56) References Cited

U.S. PATENT DOCUMENTS

| | | |
|---|---|---|
| 3,646,808 A | 3/1972 | Leonard |
| 4,043,193 A * | 8/1977 | Bailey ..................... E21B 21/08 73/152.22 |
| 6,234,250 B1 * | 5/2001 | Green ................. E21B 47/0003 166/250.03 |
| 6,615,917 B2 | 9/2003 | Bussear et al. |

(Continued)

FOREIGN PATENT DOCUMENTS

| | | |
|---|---|---|
| CN | 201218067 Y | 4/2009 |
| CN | 201581838 U | 9/2010 |

(Continued)

OTHER PUBLICATIONS

International Search Report and Written Opinion for International Application No. PCT/US2018/018470; International Filing Date Feb. 16, 2018; Report dated Apr. 24, 2018 (pp. 1-12).

*Primary Examiner* — Robert E Fuller
*Assistant Examiner* — Theodore N Yao
(74) *Attorney, Agent, or Firm* — Bracewell LLP; Constance G. Rhebergen; Vivek P. Shankam (57) ABSTRACT

A drilling fluid system and associated method for supplying drilling mud to a drilling operation includes a plurality of first sensors associated with a first mud pit, configured to measure a plurality of properties of the drilling mud in the first mud pit, a plurality of second sensors associated with a second mud pit, configured to measure the plurality of properties of the drilling mud in the second mud pit, and a control unit configured to receive measurements from the plurality of first sensors and the plurality of second sensors, determine which of the mud pits comprises drilling mud with a desired plurality of properties, and cause to operate a first valve associated with the first mud pit or a second valve associated with the second mud pit for selecting drilling mud from the first mud pit or the second mud pit based on the determination.

20 Claims, 3 Drawing Sheets

(56) References Cited

U.S. PATENT DOCUMENTS

| | | | |
|---|---|---|---|
| 6,719,055 B2 | 4/2004 | Mese et al. | |
| 7,823,656 B1 * | 11/2010 | Williams | E21B 21/01 |
| | | | 175/206 |
| 8,210,260 B2 | 7/2012 | Milkovisch et al. | |
| 8,556,083 B2 | 10/2013 | Burnett | |
| 9,303,509 B2 | 4/2016 | Milkovisch et al. | |
| 9,518,434 B1 * | 12/2016 | Champness | E21B 21/01 |
| 2007/0084638 A1 | 4/2007 | Bohnsack et al. | |
| 2008/0308272 A1 | 12/2008 | Thomeer et al. | |
| 2009/0145660 A1 * | 6/2009 | Johnson | E21B 17/003 |
| | | | 175/25 |
| 2015/0135814 A1 | 5/2015 | Zuo et al. | |
| 2015/0224550 A1 | 8/2015 | Frazier | |
| 2016/0201412 A1 | 7/2016 | Midlang et al. | |
| 2017/0175467 A1 * | 6/2017 | Francois | E21B 47/08 |
| 2017/0204688 A1 * | 7/2017 | Song | E21B 21/01 |
| 2018/0016875 A1 * | 1/2018 | Shokanov | E21B 41/0057 |

FOREIGN PATENT DOCUMENTS

| | | |
|---|---|---|
| CN | 101871329 A | 10/2010 |
| CN | 201874500 U | 6/2011 |
| CN | 202325324 U | 7/2012 |
| EP | 2927420 A2 | 10/2015 |
| WO | WO2010085401 A1 | 7/2010 |
| WO | WO2015023185 A1 | 2/2015 |
| WO | WO2015153419 A1 | 10/2015 |

* cited by examiner

SMART SELECTIVE DRILLING FLUID SYSTEM

TECHNICAL FIELD

The present invention relates to drilling of wells for exploration or production of hydrocarbons. More specifically, the invention relates to systems and methods for sensing properties of the drilling mud to be pumped into the well for pressure control and lubrication, sensing the properties of the mud returning from the well, and triggering corrective action to optimize the properties of the mud to be pumped into the well.

BACKGROUND

Choice of a particular type of drilling fluid depends on the subterranean formation characteristics, including geologic formations and mineralogy, borehole stability requirements, presence of any abnormal pressure zones in the formation, and any need to prevent underground water pollution. Whenever one of such existing conditions changes, then the entire fluid system may have to be modified based on the new conditions. Such changes in the fluid system are expensive and time-consuming. Moreover, the fluid system that may properly solve an encountered problem may be less than optimum for the rest of the drilling column.

Mud rheology plays a fundamental role in drilling oil and gas wells. If the rheology of the fluid is not appropriate for the formation and physical conditions of the well, the drilling operations may be spoiled with drilling problems such as lost circulation, poor hole cleaning, fracturing phenomena of the crossed formations, and stuck pipe, for example. Some of the main drilling parameters involved are cutting, lifting and hole cleaning efficiencies, resulting both from variation of the velocity profile of the fluid flow, and from variation of the rheological parameters, and the pressure spatial distribution along the well profile. It is extremely important for the drilling fluid to be able to transport cuttings up to the well surface without any restriction in any of the existing annulus sections. Such unrestricted transport depends on many parameters including the geometry of the annulus section, the rotation velocity of the drill string, the rate of drill bit penetration into the formation, the flow rate of the drilling fluid, the cuttings characteristics, and above all the rheology of the used drilling fluid. It is very important to keep a constant limit on the concentration values of the cuttings during the cuttings transport to avoid solid particle deposition inside the well, risking problems of borehole occlusion, bit balling, and drill string sticking during the drilling process.

Although the efficiency of a number of different drilling fluids in transporting cuttings has been reported at values up to 80%, new technical problems arise when drilling deep water and ultradeep wells. Such problems are compounded when the effects of high pressure and temperature are considered. High temperatures can heavily alter and sometimes reduce the viscosity of a drilling mud or a completion fluid and can enhance the speed of chemical reactions within such mud or fluid. These consequences can in turn result in other consequences such as increased dispersion or flocculation of the mud solids with resultant increase in fluid loss properties and change in the thickness of the mud cake.

Optimum drilling mud is therefore essential to control the pressure of the well, provide lubrication and cooling, and for transport of drilled out material. Different muds are needed for different conditions, depending on several factors, resulting in mud of specific properties for specific conditions. The best known parameters characterizing mud are viscosity and density. The mud can be based on water, or mineral, or hydrocarbon oil, and can include traditional materials like bentonite clays or other natural materials or synthetic materials. The selection and formulation of the mud is managed by the mud engineer.

It is industry practice to monitor the properties of the mud returning from the well. This is essential in order to detect traces of hydrocarbons, particularly traces of gas, which can give an early warning of a gas kick or uncontrolled pressure rise. However, with respect to the mud to be pumped down into the well by the mud pumps, it is industry practice to take manual samples in order to ensure that the mud properties are as intended. The sample must typically be sent to a laboratory, either on the drilling rig or on land at a remote location, and the process of analyzing may take considerable time. For drilling operations offshore, time is very expensive, and even a moderate reduction in wasted time can have a significant impact on the economy of the operation. Another aspect is the increased safety if it could be ensured at all times that only mud having the correct properties is pumped down the drill string.

Managing drilling fluid properties at the rig site is a critical step to delivering every well successfully. Fluctuations in these properties, however are inevitable, and even minor deviations in the drilling fluid can have dramatic impacts on wellbore stability, hole cleaning, equivalent circulating density (ECD), and overall drilling performance. Hydraulic simulations are an essential part of planning the drilling program, and real-time data can offer greater opportunities to improve overall operations.

Many technologies exist for data acquisition and processing of data. Many technologies exists for collecting samples of mud coming up from the well, and some for collecting samples of mud as mixed and to be pumped down the drill string. In addition, many technologies exist for analyzing single parameters of the mud.

However, a demand still exists for technology in order to reduce the time spent for monitoring the mud properties, provide continuous monitoring, provide data for more parameters than current industry standard practice, reduce the risk of pumping incorrect mud composition, reduce waste, tankage requirement, and ineffective drilling unit time and increase safety. The objective of the present invention is to meet the demand.

SUMMARY

One example embodiment is a drilling fluid system for supplying drilling mud to a drilling operation. The drilling fluid system includes a first mud pit for receiving drilling mud from a first mud input, a plurality of first sensors associated with the first mud pit, the plurality of first sensors configured to measure a plurality of properties of the drilling mud in the first mud pit, a second mud pit for receiving drilling mud from a second mud input, a plurality of second sensors associated with the second mud pit, the plurality of second sensors configured to measure the plurality of properties of the drilling mud in the second mud pit, and a control unit operatively coupled to the plurality of first sensors and the plurality of second sensors, the control unit further configure to receive measurements from the plurality of first sensors and the plurality of second sensors, determine which of the mud pits includes drilling mud with a desired plurality of properties, and cause to operate a first valve associated with the first mud pit or a second valve associated with the second mud pit for selecting drilling mud from the first mud pit or the second mud pit based on the determination. The system may also include a third mud pit for receiving drilling mud from a third mud input, a plurality of third sensors associated with the third mud pit, the plurality of third sensors configured to measure the plurality of properties of the drilling mud in the third mud pit, and the control unit operatively coupled to the plurality of third sensors, the control unit further configure to receive measurements from the plurality of third sensors, determine which of the mud pits includes drilling mud with the desired plurality of properties, and cause to operate the first valve, the second valve, or a third valve associated with the third mud pit for selecting drilling mud from the first mud pit or the second mud pit or the third mud pit based on the determination.

The system may also include a mud suction manifold for receiving the drilling mud from the first mud pit, the second mud pit, or the third mud pit, and supplying the drilling mud to the well bore. The control unit may also be configured to trigger an alarm if the measurements from the plurality of first sensors or the plurality of second sensors or the plurality of third sensors are outside of a predetermined threshold, the predetermined threshold being predefined for each of the plurality of properties, and cause corrective action in one or more mud pits where the measurements are outside of the predetermined threshold. The corrective action may be notified in real time to a mud engineer in a control room located offshore or onshore. The plurality of first sensors, second sensors, and third sensors include at least one of a temperature sensor, conductivity sensor, density sensor, pH sensor, viscosity sensor, Rheometer, pressure sensor, chemical sensor, and a particle size analyzer. The plurality of properties include at least one of mud temperature, weight, density, viscosity, rheology, gel strength, pH, hardness, conductivity, sand content, particle size, pressure, Calcium content, Magnesium content, Chloride content, Potassium content, alkalinity or lime content, and clay content. The measurements are obtained in real time, and the plurality of first sensors, second sensors, and third sensors are certified to operate in hazardous environments.

Another example embodiment is a method for selectively supplying drilling mud to a drilling operation. The method includes measuring, by a plurality of first sensors associated with a first mud pit, a plurality of properties of the drilling mud in the first mud pit, measuring, by a plurality of second sensors associated with a second mud pit, the plurality of properties of the drilling mud in the second mud pit, receiving, by a control unit operatively coupled to the plurality of first sensors and the plurality of second sensors, measurements from the plurality of first sensors and the plurality of second sensors, determining, by the control unit, which of the mud pits includes drilling mud with a desired plurality of properties, and causing, by the control unit, to operate a first valve associated with the first mud pit or a second valve associated with the second mud pit for selecting drilling mud from the first mud pit or the second mud pit based on the determining step.

The method may also include measuring, by a plurality of third sensors associated with a third mud pit, the plurality of properties of the drilling mud in the third mud pit, receiving, by the control unit, measurements from the plurality of third sensors, determining, by the control unit, which of the mud pits includes drilling mud with the desired plurality of properties, and causing, by the control unit, to operate the first valve, the second valve, or a third valve associated with the third mud pit for selecting drilling mud from the first mud pit or the second mud pit or the third mud pit based on the determining step. The method may also include receiving the drilling mud from the first mud pit, the second mud pit, or the third mud pit in a mud suction manifold, and supplying the drilling mud from the mud suction manifold to the well bore. The method may also include triggering an alarm, by the control unit, if the measurements from the plurality of first sensors or the plurality of second sensors or the plurality of third sensors are outside of a predetermined threshold, the predetermined threshold being predefined for each of the plurality of properties, and causing, by the control unit, corrective action in one or more mud pits where the measurements are outside of the predetermined threshold.

The corrective action may be notified in real time to a mud engineer in a control room located offshore or onshore. The plurality of first sensors, second sensors, and third sensors include at least one of a temperature sensor, conductivity sensor, density sensor, pH sensor, viscosity sensor, Rheometer, pressure sensor, chemical sensor, and a particle size analyzer. The plurality of properties include at least one of mud temperature, weight, density, viscosity, rheology, gel strength, pH, hardness, conductivity, sand content, particle size, pressure, Calcium content, Magnesium content, Chloride content, Potassium content, alkalinity or lime content, and clay content. The measurements are obtained in real time, and the plurality of first sensors, second sensors, and third sensors are certified to operate in hazardous environments.

Another example embodiment is a control unit in a drilling fluid system. The control unit may be configured to receive measurements of a plurality of mud properties from a plurality of first sensors associated with a first mud pit, receive measurements of the plurality of mud properties from a plurality of second sensors associated with a second mud pit, determine which of the mud pits includes drilling mud with a desired plurality of properties, and cause to operate a first valve associated with the first mud pit or a second valve associated with the second mud pit for selecting drilling mud from the first mud pit or the second mud pit based on the determination. The control unit may also be configured to receive measurements of the plurality of mud properties from a plurality of third sensors associated with a third mud pit, determine which of the mud pits includes drilling mud with the desired plurality of properties; and cause to operate the first valve, the second valve, or a third valve associated with the third mud pit for selecting drilling mud from the first mud pit or the second mud pit or the third mud pit based on the determination. The control unit may also be configured to trigger an alarm if the measurements from the plurality of first sensors or the plurality of second sensors or the plurality of third sensors are outside of a predetermined threshold, the predetermined threshold being predefined for each of the plurality of properties, and cause corrective action in one or more mud pits where the measurements are outside of the predetermined threshold. The desired plurality of properties is determined by comparing measurements from the first mud pit, the second mud pit, and the third mud pit, and selecting the mud pit with the highest number of measurements that fall within the predetermined threshold values.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

Figure 1:
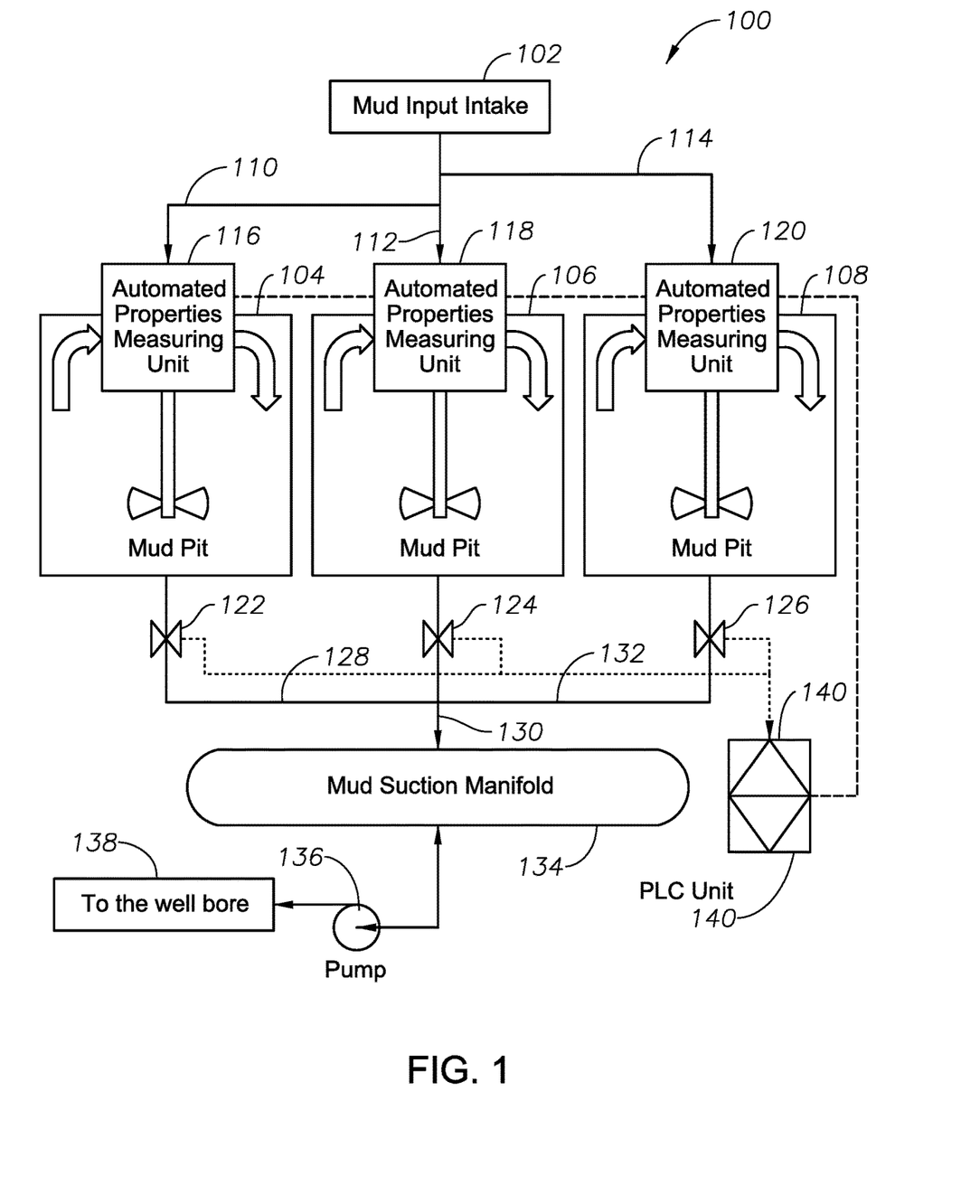
FIG. 1 is a schematic block diagram of a drilling fluid system for supplying drilling mud to a drilling operation, according to one or more example embodiments of the disclosure.

Turning now to the drawings, FIG. 1 is a schematic block diagram of a drilling fluid system 100 for supplying drilling mud to a drilling operation, according to one or more example embodiments of the disclosure. The drilling fluid system 100 includes a mud input intake 102 that receives mud outputted from the well. The mud input intake 102 supplies the drilling mud along with a combination of other fluids to mud pits 104, 106, and 108 via inlet pipes 110, 112, and 114, respectively. Each mud pit 104, 106, 108 is equipped with an automated mud properties measuring unit 116, 118, and 120, respectively, that measures properties of the drilling mud entering the mud pit. Each of the measuring units 116, 118, 120 may include one or more sensors that may be selected temperature sensors, conductivity sensors, density sensors, pH sensors, viscosity sensors, Rheometers, pressure sensors, chemical sensors, and particle size analyzers. Each of these sensors may be configured to measure one or more properties of the drilling mud in the mud pit. These properties include temperature, weight, density, viscosity, rheology, gel strength, pH, hardness, conductivity, sand content, particle size, pressure, Calcium content, Magnesium content, Chloride content, Potassium content, alkalinity or lime content, and clay content of the drilling mud. The sensors may be certified to operate in hazardous environments, such as drilling environment, for example.

In one example embodiment, the drilling fluid system 100 may include a first mud pit 104 for receiving drilling mud from a first mud input line 110. A plurality of first sensors may be associated with the automated properties measuring unit 116 in the first mud pit. The plurality of first sensors may be configured to measure a plurality of properties of the drilling mud in the first mud pit 104. Similarly, system 100 may include a second mud pit 106 for receiving drilling mud from a second mud input line 112. A plurality of second sensors may be associated with the automated properties measuring unit 118 in the second mud pit 106. The plurality of second sensors may be configured to measure the plurality of properties of the drilling mud in the second mud pit 106. System 100 may also include a third mud pit 108 for receiving drilling mud from a third mud input line 114. A plurality of third sensors may be associated with the automated properties measuring unit 120 in the third mud pit 108 and may be configured to measure the plurality of properties of the drilling mud in the third mud pit 108.

The output from each of the mud pits 104, 106, 108 may be connected to a mud suction manifold 134 via outlet lines 128, 130, and 132, respectively. Outlet lines 128, 130, 132 are equipped with valves 122, 124, and 126, respectively, which are used to control the outflow of the drilling fluid from mud pits 104, 106, and 108, respectively.

Fluid system 100 also includes a control unit 140, which may be operatively coupled to the sensors in the automated properties measuring units 116, 118, and 120. Control unit 140 may include one or more programmable logic controllers (PLCs) or one or more processors (CPUs). The control unit is configured to receive measurements from the sensors in the automated properties measuring units 116, 118, and 120, compare the measurements and determine which of the mud pits 104, 106, 108 includes drilling mud with the most desired properties. The control unit 140 then causes to operate the first valve 122, the second valve 124, or a third valve 126 for selecting drilling mud from the first mud pit 104 or the second mud pit 106 or the third mud pit 108 based on the determination.

Fluid system 100 may also include a mud suction manifold 134 for receiving the drilling mud from the first mud pit 104, the second mud pit 106, or the third mud pit 108, and supplying the drilling mud to the well bore 138 using a pump 136.

According to one example embodiment, control unit 140 may also be configured to trigger an alarm if the measurements from the plurality of first sensors or the plurality of second sensors or the plurality of third sensors are outside of a predetermined threshold. A predetermined threshold may be predefined for each of the properties of the drilling mud, such as temperature, weight, density, viscosity, rheology, gel strength, pH, hardness, conductivity, sand content, particle size, pressure, Calcium content, Magnesium content, Chloride content, Potassium content, alkalinity or lime content, and clay content of the drilling mud. The control unit 140 may cause corrective action in one or more mud pits where the measurements may be outside of the predetermined threshold. The corrective action may be notified in real time to a mud engineer in a control room located offshore or onshore depending on where the drilling is being carried out. Each of the automated properties measuring units 116, 118, 120 may include one or more temperature sensors, conductivity sensors, density sensors, pH sensors, viscosity sensors, Rheometers, pressure sensors, chemical sensors, and particle size analyzers.

Figure 2:
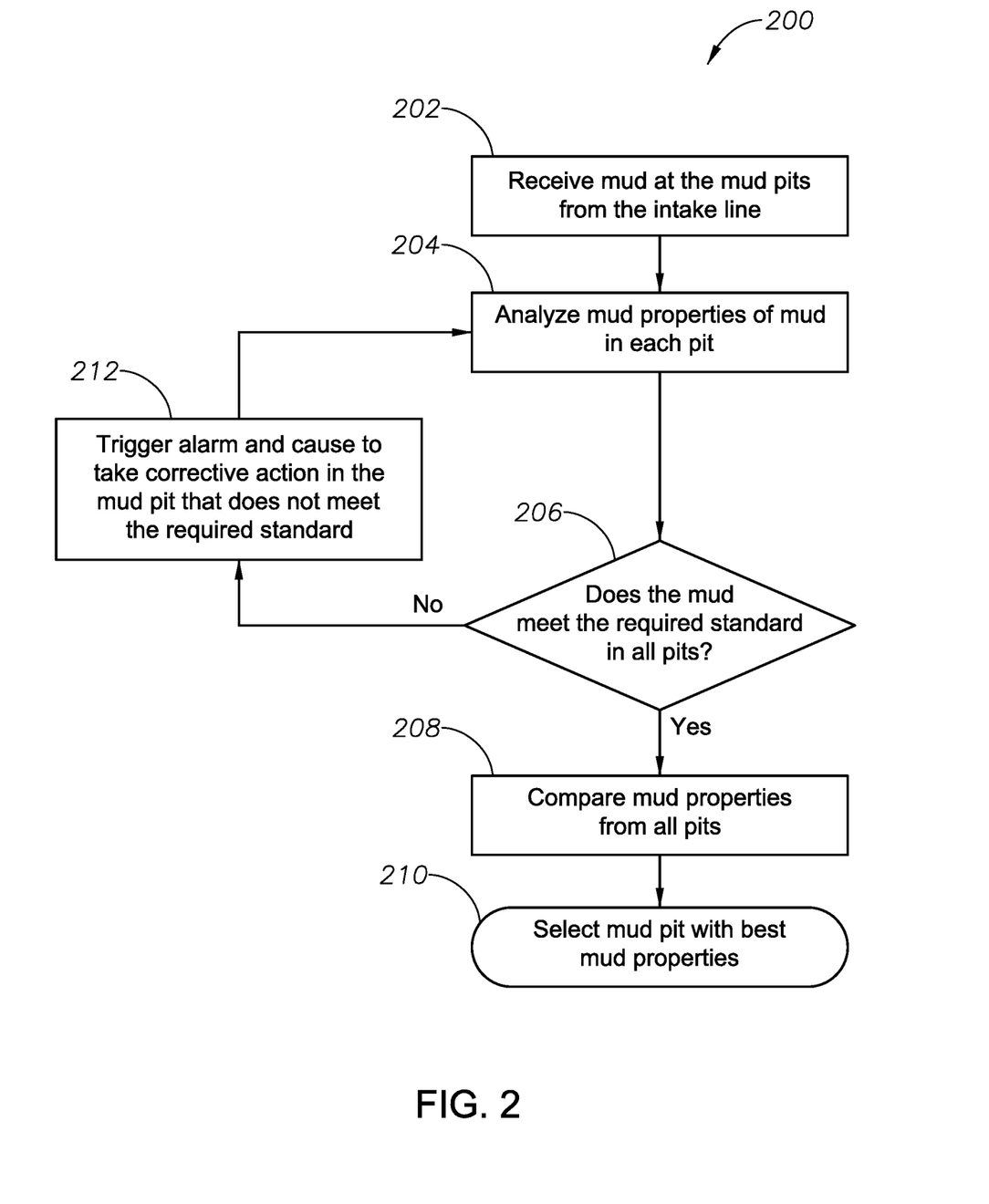
FIG. 2 illustrates example operations in an example method for selectively supplying drilling mud to a drilling operation, according to one or more example embodiments of the disclosure.

FIG. 2 illustrates example operations in an example method 200 for selectively supplying drilling mud to a drilling operation, according to one or more example embodiments of the disclosure. The method may include, at step 202, receiving mud at the mud pits from the intake line, and analyzing mud properties of the drilling mud in each mud pit at step 204. At step 206, the control unit would check to see if the drilling mud meets the required standard in all pits. If the drilling mud meets the required standard in all pits, then the control unit would compare mud properties from all the pits, at step 208, and select the mud pit with the best or most desired mud properties, in step 210. The desired properties may be determined by comparing measurements from the first mud pit, the second mud pit, and the third mud pit, and selecting the mud pit with the highest number of measurements that fall within the predetermined threshold values. However, if the drilling mud in one or more mud pits does not meet the required standards or does not fall within the predetermined threshold values, then the control unit would trigger an alarm, in step 212, and cause to take corrective action in the mud pit that does not meet the required standard. In such an instance, the mud engineer may be notified to take further corrective action to bring the drilling mud properties back to the predetermined levels. Alternatively, the system may be include additional equipment that may be configured to automatically bring the drilling mud properties back to the predetermined levels.

Figure 3:
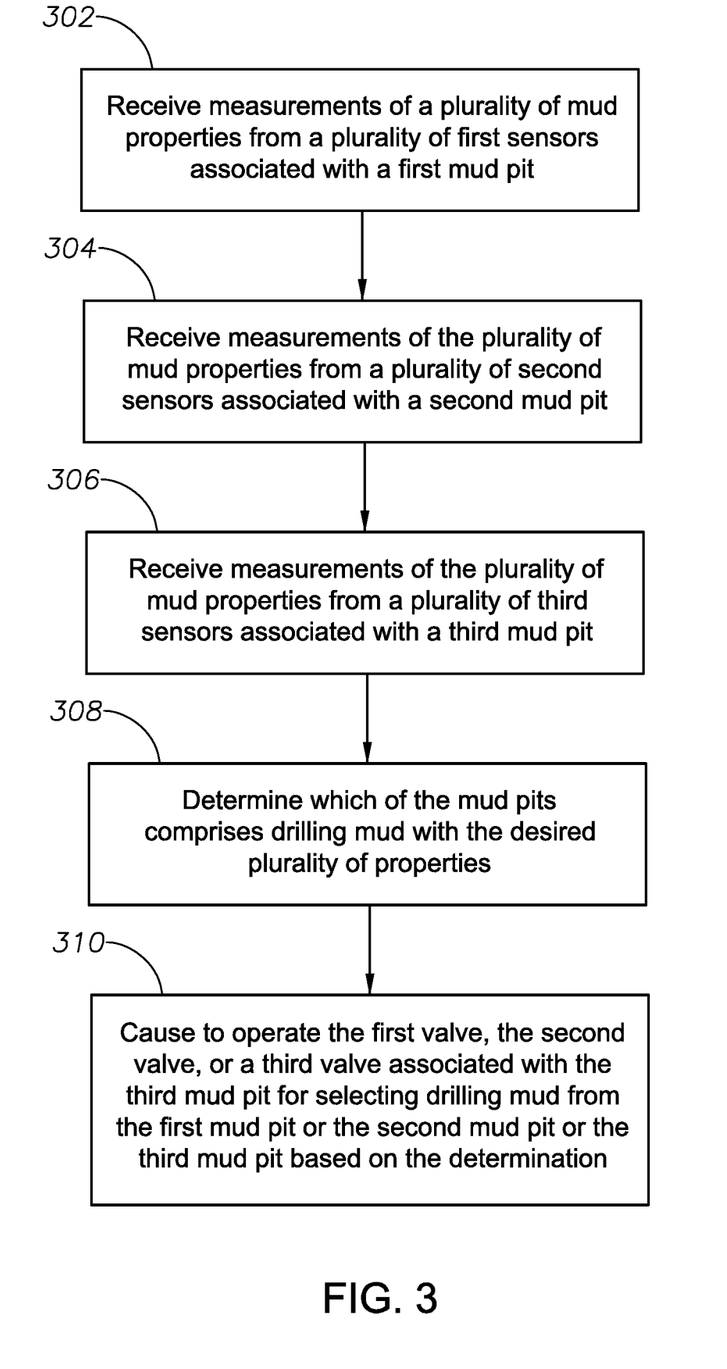
FIG. 3 illustrates example operations carried out by a control unit in a drilling fluid system, according to one or more example embodiments of the disclosure.

FIG. 3 illustrates example operations carried out by a control unit 140 in a drilling fluid system 100, according to one or more example embodiments of the disclosure. The control unit may 140 be configured to receive measurements of a plurality of mud properties from a plurality of first sensors associated with a first mud pit in step 302. At step 304, the control unit may receive measurements of the plurality of mud properties from a plurality of second sensors associated with a second mud pit. At step 306, the control unit may receive measurements of the plurality of mud properties from a plurality of third sensors associated with a third mud pit. At step 308, the control unit may determine which of the mud pits includes drilling mud with the desired properties, and in step 310, the control unit may cause to operate the first valve, the second valve, or a third valve for selecting drilling mud from the first mud pit or the second mud pit or the third mud pit based on the determination.

In one example embodiment, the control unit may also be configured to trigger an alarm if the measurements from the first sensors or the second sensors or the third sensors are outside of a predetermined threshold. The predetermined threshold may be predefined for each of the mud properties, and the control unit may be configured to cause corrective action in one or more mud pits where the measurements are outside of this predetermined threshold. The desired mud properties may be determined by comparing measurements from the first mud pit, the second mud pit, and the third mud pit, and selecting the mud pit with the highest number of measurements that fall within these predetermined threshold values, for example.

The control unit may also be configured to cause to operate the first valve, the second valve, or a third valve for selecting drilling mud from the first mud pit or the second mud pit or the third mud pit based on this determining step. The method may also include receiving the drilling mud from the first mud pit, the second mud pit, or the third mud pit in a mud suction manifold, and supplying the drilling mud from the mud suction manifold to the well bore. The method may also include triggering an alarm, by the control unit, if the measurements from the plurality of first sensors or the plurality of second sensors or the plurality of third sensors are outside of a predetermined threshold, the predetermined threshold being predefined for each of the mud properties, and causing, by the control unit, corrective action in one or more mud pits where the measurements are outside of the predetermined threshold.

The corrective action may be notified in real time to a mud engineer in a control room located offshore or onshore. The sensors in each of the above example embodiments include at least one of a temperature sensor, conductivity sensor, density sensor, pH sensor, viscosity sensor, Rheometer, pressure sensor, chemical sensor, and a particle size analyzer. The mud properties that are measured by these sensors include at least one of mud temperature, weight, density, viscosity, rheology, gel strength, pH, hardness, conductivity, sand content, particle size, pressure, Calcium content, Magnesium content, Chloride content, Potassium content, alkalinity or lime content, and clay content. The sensors may be certified to operate in hazardous environments, such as a drilling environment, for example.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A drilling fluid system for supplying drilling mud to a drilling operation, the drilling fluid system comprising:
    a first mud pit for receiving drilling mud from a first mud input;

a plurality of first sensors associated with the first mud pit, the plurality of first sensors configured to measure a plurality of properties of the drilling mud in the first mud pit;

a second mud pit for receiving drilling mud from a second mud input;

a plurality of second sensors associated with the second mud pit, the plurality of second sensors configured to measure the plurality of properties of the drilling mud in the second mud pit; and a control unit operatively coupled to the plurality of first sensors and the plurality of second sensors, the control unit further configure to:

receive measurements from the plurality of first sensors and the plurality of second sensors in real time;

compare measurements from the plurality of first sensors to the measurements from the plurality of second sensors;

determine which of the mud pits comprises drilling mud with the most number of measurements that fall within predetermined threshold values predefined for each of the plurality of properties; and cause to operate a first valve associated with the first mud pit or a second valve associated with the second mud pit for selecting drilling mud from the first mud pit or the second mud pit based on the determination.

2. The system of claim 1, further comprising:

a third mud pit for receiving drilling mud from a third mud input;

a plurality of third sensors associated with the third mud pit, the plurality of third sensors configured to measure the plurality of properties of the drilling mud in the third mud pit; and the control unit operatively coupled to the plurality of third sensors, the control unit further configure to:

receive measurements from the plurality of third sensors;

determine which of the mud pits comprises drilling mud with the most number of measurements that fall within predetermined threshold values predefined for each of the plurality of properties; and cause to operate the first valve, the second valve, or a third valve associated with the third mud pit for selecting drilling mud from the first mud pit or the second mud pit or the third mud pit based on the determination.

3. The system of claim 2, further comprising:

a mud suction manifold for receiving the drilling mud from the first mud pit, the second mud pit, or the third mud pit, and supplying the drilling mud to a well bore.

4. The system of claim 2, wherein the control unit is further configured to:

trigger an alarm if the measurements from the plurality of first sensors or the plurality of second sensors or the plurality of third sensors are outside of a predetermined threshold, the predetermined threshold being predefined for each of the plurality of properties; and cause corrective action in one or more mud pits where the measurements are outside of the predetermined threshold.

5. The system according to claim 4, wherein the corrective action is notified in real time to a mud engineer in a control room located offshore or onshore.

6. The system of claim 2, wherein the plurality of first sensors, second sensors, and third sensors comprise at least one of a temperature sensor, conductivity sensor, density sensor, pH sensor, viscosity sensor, Rheometer, pressure sensor, chemical sensor, and a particle size analyzer.

7. The system according to claim 6, wherein the measurements are obtained in real time, and the plurality of first sensors, second sensors, and third sensors are capable of operating in hazardous environments.

8. The system of claim 2, wherein the plurality of properties comprise at least one of mud temperature, weight, density, viscosity, rheology, gel strength, pH, hardness, conductivity, sand content, particle size, pressure, Calcium content, Magnesium content, Chloride content, Potassium content, alkalinity or lime content, and clay content.

9. A method for selectively supplying drilling mud to a drilling operation, the method comprising:

measuring, by a plurality of first sensors associated with a first mud pit, a plurality of properties of the drilling mud in the first mud pit;

measuring, by a plurality of second sensors associated with a second mud pit, the plurality of properties of the drilling mud in the second mud pit;

receiving, by a control unit operatively coupled to the plurality of first sensors and the plurality of second sensors, measurements from the plurality of first sensors and the plurality of second sensors in real time;

comparing, by the control unit, measurements from the plurality of first sensors and to the measurements from the plurality of second sensors;

determining, by the control unit, which of the mud pits comprises drilling mud with the most number of measurements that fall within predetermined threshold values predefined for each of the plurality of properties; and causing, by the control unit, to operate a first valve associated with the first mud pit or a second valve associated with the second mud pit for selecting drilling mud from the first mud pit or the second mud pit based on the determining step.

10. The method of claim 9, further comprising:

measuring, by a plurality of third sensors associated with a third mud pit, the plurality of properties of the drilling mud in the third mud pit;

receiving, by the control unit, measurements from the plurality of third sensors;

determining, by the control unit, which of the mud pits comprises drilling mud with the most number of measurements that fall within predetermined threshold values predefined for each of the plurality of properties; and causing, by the control unit, to operate the first valve, the second valve, or a third valve associated with the third mud pit for selecting drilling mud from the first mud pit or the second mud pit or the third mud pit based on the determining step.

11. The method of claim 10, further comprising:

receiving the drilling mud from the first mud pit, the second mud pit, or the third mud pit in a mud suction manifold; and supplying the drilling mud from the mud suction manifold to a well bore.

12. The method of claim 10, further comprising:

triggering an alarm, by the control unit, if the measurements from the plurality of first sensors or the plurality of second sensors or the plurality of third sensors are outside of a predetermined threshold, the predetermined threshold being predefined for each of the plurality of properties; and causing, by the control unit, corrective action in one or more mud pits where the measurements are outside of the predetermined threshold.

13. The method of claim 12, wherein the corrective action is notified in real time to a mud engineer in a control room located offshore or onshore.

14. The method of claim 10, wherein the plurality of first sensors, second sensors, and third sensors comprise at least one of a temperature sensor, conductivity sensor, density sensor, pH sensor, viscosity sensor, Rheometer, pressure sensor, chemical sensor, and a particle size analyzer.

15. The method of claim 10, wherein the plurality of properties comprise at least one of mud temperature, weight, density, viscosity, rheology, gel strength, pH, hardness, conductivity, sand content, particle size, pressure, Calcium content, Magnesium content, Chloride content, Potassium content, alkalinity or lime content, and clay content.

16. The method of claim 10, wherein the measurements are obtained in real time, and the plurality of first sensors, second sensors, and third sensors are capable of operating in hazardous environments.

17. A control unit in a drilling fluid system, the control unit configured to:
receive measurements of a plurality of mud properties from a plurality of first sensors associated with a first mud pit, in real time;
receive measurements of the plurality of mud properties from a plurality of second sensors associated with a second mud pit, in real time;
compare measurements from the plurality of first sensors to the measurements from the plurality of second sensors;
determine which of the mud pits comprises drilling mud with the most number of measurements that fall within predetermined threshold values predefined for each of the plurality of properties; and
cause to operate a first valve associated with the first mud pit or a second valve associated with the second mud pit for selecting drilling mud from the first mud pit or the second mud pit based on the determination.

18. The control unit of claim 17, further configured to:
receive measurements of the plurality of mud properties from a plurality of third sensors associated with a third mud pit;
determine which of the mud pits comprises drilling mud with the most number of measurements that fall within predetermined threshold values predefined for each of the plurality of properties; and
cause to operate the first valve, the second valve, or a third valve associated with the third mud pit for selecting drilling mud from the first mud pit or the second mud pit or the third mud pit based on the determination.

19. The control unit of claim 18, further configured to:
trigger an alarm if the measurements from the plurality of first sensors or the plurality of second sensors or the plurality of third sensors are outside of a predetermined threshold, the predetermined threshold being predefined for each of the plurality of properties; and
cause corrective action in one or more mud pits where the measurements are outside of the predetermined threshold.

20. The control unit of claim 19, wherein the determining step further comprises comparing measurements from the first mud pit, the second mud pit, and the third mud pit, and selecting the mud pit with the most number of measurements that fall within the predetermined threshold values.

* * * * *

UNITED STATES PATENT AND TRADEMARK OFFICE
CERTIFICATE OF CORRECTION

PATENT NO. : 10,502,009 B2
APPLICATION NO. : 15/434575
DATED : December 10, 2019
INVENTOR(S) : Ossama R. Sehsah Page 1 of 1

It is certified that error appears in the above-identified patent and that said Letters Patent is hereby corrected as shown below:

In the Claims

In Column 10, Claim 9, Line 27 should read:
-- plurality of first sensors to the measurements from --

Signed and Sealed this
Twenty-eighth Day of January, 2020

Andrei Iancu
*Director of the United States Patent and Trademark Office*